Patented Oct. 9, 1934

1,976,246

UNITED STATES PATENT OFFICE 1,976,246

FOOD PRODUCT AND METHOD OF MANUFACTURE

David D. Peebles, Eureka, Calif.

No Drawing. Application June 14, 1932, Serial No. 617,255

9 Claims. (Cl. 99—5)

This invention relates generally to food products suitable for livestock or human consumption, and to methods of manufacturing the same.

It is an object of the invention to devise a food product which will be relatively high in vitamin content and nutritive value, and which will be readily digestible.

It is a further object of the invention to devise a food product in powdered and substantially nonhygroscopic condition, which will contain certain well preserved ingredients of high nutritive value, particularly yeast and solids of milk.

It is a further object of the invention to devise a novel process making possible the commercial manufacture of a product attaining the above outlined objects.

Further objects of the invention will appear from the following description in which the preferred manner of carrying out my process, and the product resulting therefrom, have been set forth in detail.

One manner of carrying out my process is as follows:—Whey is formed by treatment of skim milk, either with a mineral acid, or by the development of lactic acid by lactic acid bacilli (self-sour process). The use of hydrochloric acid is not as advantageous as either sulphuric acid or the self-sour process, because subsequent addition of slaked lime as a neutralizing agent results in formation of chlorides which hinder yeast growth. Subsequent addition of a neutralizing agent such as slaked lime to whey produced by treatment with sulphuric acid or by the self-sour process, results in formation of calcium sulphate or calcium lactate which assist yeast growth.

After the whey is produced it is heated to a temperature sufficiently high to temporarily arrest further lactic acid development, as for example a temperature of about 170 deg. F. It is then concentrated to about 25 to 30% solids, in suitable apparatus such as disclosed in Peebles Patent No. 1,438,502. A somewhat lower percentage of concentration can be employed, where other conventional types of concentrators are used. The acidity of the concentrate is then partially neutralized with slaked or hydrated lime, to about 0.8% lactic acid remaining in the concentrate.

The partially neutralized concentrate produced as explained above is then brought to a temperature of about 85 to 95° F., and is introduced into a suitable aerating tank. Molasses is then added in an amount equal to about 10% by weight of the total whey solids present in the batch of concentrate. The process is not critical with respect to the amount of molasses, except that sufficient molasses is added to present, together with other materials added, enough invert sugar to supply the carbohydrate required for yeast growth. At the same time a mixture of flour, starch, dextrines and glucose can be added. This mixture is made in advance by taking an amount of wheat flour equal to about 6% of the total whey solids in the batch of concentrate, adding water to make a thin slurry, adding 0.2% of sulphuric acid, and then heating continuously with steam for about 24 hours. The flour is thus largely changed to starch and dextrine, and a part of the starch and dextrine to glucose or invert sugar. The amount of this mixture added need not be exact. If it is omitted the amount of molasses added should be increased.

A suitable starter is then added to the concentrate. This starter can be made in advance by taking one part of molasses to four parts of raw whey, and adding a suitable baker's compressed yeast. The mixture is maintained at a temperature of 85 to 95° F., for a period of about 12 hours, while it is being aerated. Yeast growth commences within the starter, and due to the lactic acid present from the raw whey, the yeast is somewhat accommodated to a lactic acid environment. About 10 gallons of the starter to about 2000 gallons of whey, will give good results.

Following the above steps the growth of yeast is permitted to proceed, while the mixture in the tank is being continually aerated, and while the material is maintained at a suitable temperature for yeast growth of about 85 to 95 deg. F. A period of treatment in the aerating tank of about 12 to 24 hours will give good results.

Various additional yeast foods, such as phosphates, sulphates and the like, may be added to the concentrate if desired, but are not essential.

During treatment in the aerating tank, the yeast becomes further accommodated or conditioned to a lactic acid environment, and at the same time the lactic acid prevents the development of proteolytic organisms which would deteriorate the protein present. The invert sugar added to the material serves as the principal food for the growth of yeast. The lactic acid concentration tends to increase during the treatment, due to the development of lactic acid from the lactose of the whey. This latter characteristic is desirable, in that it tends to offset any increased tendency for proteolytic organisms to develop, which would deteriorate the protein present, as the yeast becomes older.

To form a readily marketable product, the resulting material is then passed thru a suitable spray type desiccator to form a dry powdered product. Before being desiccated the material is preferably partially neutralized, by hydrated lime, to leave about 0.6 to 0.8% lactic acid remaining in the material. It has been found that this dry powdered product is somewhat hygroscopic when exposed to the atmosphere, and will tend to cake by absorption of moisture. This is due to the fact that the milk sugar content of the product is mainly in the form of an anhydride. Therefore in a further step of the process, the product is stabilized. During this stabilizing treatment the dry powdered material is caused to absorb moisture while in suspension in a gas, a settled mass of the material is permitted to set to enable complete conversion of the milk sugar to the form of a monohydrate, and then the material is suspended and contacted with a dry gas at an elevated temperature to remove excess moisture. The final product remains in divided condition, and is substantially dry, although the milk sugar content contains water of crystallization.

A commercial analysis of my product is as follows:

|  | Percent |
|---|---|
| Moisture | 1 (Free) |
| Protein | 14.8 |
| Sugar as lactose hydrate | 55.0 |
| Lactic acid | 3.2 |
| Ash | 11.9 |

While a certain amount of protein is consumed by the yeast growth during my process, it is apparent from the above analysis that a substantial amount of protein remains in the final product, and this protein is in ready assimilable form.

Because of the character of the process the yeast present in the final product is accommodated or conditioned to the lactic acid present. If my product is mixed with a wet mash to form a poultry or livestock feed, the yeast becomes active and fermentation proceeds. In the preparation of such a fermenting mash for poultry or stock feed, the lactic acid from my product tends to prevent development of proteolytic organisms which would tend to deteriorate protein present. As has been previously explained the lactic acid is introduced together with the concentrated whey, with the starter which is made up in part of raw whey, and is further developed during treatment in the aerating tank.

With respect to the potential activity of the yeast in the final desiccated product, it should be noted that a part of the yeast cells are rendered inactive during desiccation. However the nutritive value of such yeast cells is apparently substantially the same as active cells, and the cell nutrients are preserved by the lactic acid. If desired all of the yeast cells can be killed by heat treatment, although in this event the product could not be employed to prepare a fermenting mash.

Further with respect to the nutritive value of my product, because of the yeast present, it is relatively high in vitamin B. While whey alone may contain a certain amount of vitamins, it is not relatively high in vitamin B, and if used alone or with a grain mash, as a feed for poultry or other live stock, will not result in a balanced ration. My product can be used as a basis for forming a balanced ration, which when fed to poultry or other live stock, will result in rapid growth without causing abnormalities.

With respect to certain phases of the preferred form of process disclosed herein it should be noted that the glucose from the flour forms a relatively cheap source of food and particularly invert sugar, for promoting the growth of yeast. Likewise the invert sugar and the nitrogenous ingredients of the molasses, and of the lacteal material, serve as yeast foods. Without the use of various yeast foods in addition to the solids of the whey, it will be difficult to promote the growth of yeast. Furthermore it is desirable to have the final product contain a relatively high percentage of solids from the whey, because of their high nutritive value, rather than to have such solids largely consumed during the process.

I claim:

1. A desiccated homogeneous powdered food product comprising solids of milk, together with lactic acid and yeast conditioned to a lactic acid environment.

2. A powdered homogeneous food product comprising solids of milk, together with lactic acid and yeast conditioned to a lactic acid environment, the milk sugar present containing water of crystallization whereby the product is substantially nonhygroscopic.

3. In a process of the character described for the manufacture of food products, the steps of forming a starter consisting of yeast propagated in a material containing yeast food and lactic acid, adding the starter to concentrated liquid material containing milk solids together with a substantial amount of lactic acid and invert sugar, and then permitting the yeast to grow.

4. In a process of the character described for the manufacture of food products, the steps of forming a starter consisting of yeast propagated in a material containing yeast food and lactic acid, adding the starter to concentrated liquid material containing milk solids together with a substantial amount of lactic acid and invert sugar, and then permitting the yeast to grow while substantially inhibiting putrefaction.

5. In a process of the character described for the manufacture of food products, the steps of forming a starter consisting of yeast propagated in a material containing yeast food and lactic acid, adding the starter to a concentrated liquid material containing lactose, and also containing invert sugar to form the carbohydrate requirement for yeast growth, and then aerating the mixture while permitting the yeast to grow.

6. In a process of the character described for the manufacture of food products, the steps of propagating yeast growth while substantially inhibiting putrefaction in a liquid concentrate containing milk solids, and then spray drying the resulting homogeneous material.

7. In a process of the character described for the manufacture of food products, the steps of propagating yeast growth while substantially inhibiting putrefaction in a liquid concentrate containing milk solids, partially neutralizing the material, and then spray drying the resulting homogeneous material.

8. In a process of the character described for the manufacture of food products, the steps of forming a starter by propagating growth of yeast in a material containing yeast food together with lactic acid, introducing the starter into concentrated milk whey, introducing invert sugar into the concentrated milk whey, permitting growth of yeast to proceed in the mixture while the same is being aerated, simultaneously permitting development of lactic acid from the lactose present, and then desiccating the resulting material.

9. In a process of the character described for the manufacture of food products, the steps of propagating yeast growth while substantially inhibiting putrefaction in a liquid material containing milk solids, and then drying the resulting homogeneous material to form a powder.

DAVID D. PEEBLES.